US011410662B2

(12) United States Patent
Littlejohn

(10) Patent No.: US 11,410,662 B2
(45) Date of Patent: Aug. 9, 2022

(54) CONTENT PLAYBACK SYSTEM

(71) Applicant: B & W Group Ltd, Worthington (GB)

(72) Inventor: Joe Littlejohn, Bristol (GB)

(73) Assignee: B & W GROUP LTD, Worthing (GB)

( * ) Notice: Subject to any disclaimer, the term of this patent is extended or adjusted under 35 U.S.C. 154(b) by 229 days.

(21) Appl. No.: 16/592,264

(22) Filed: Oct. 3, 2019

(65) Prior Publication Data
US 2020/0111497 A1 Apr. 9, 2020

(30) Foreign Application Priority Data
Oct. 8, 2018 (GB) ...................................... 1816363

(51) Int. Cl.
*G10L 17/22* (2013.01)
*G10L 15/22* (2006.01)
*G10L 15/30* (2013.01)
*H04M 1/724* (2021.01)

(52) U.S. Cl.
CPC .............. *G10L 17/22* (2013.01); *G10L 15/22* (2013.01); *G10L 15/30* (2013.01); *H04M 1/724* (2021.01); *G10L 2015/223* (2013.01); *G10L 2015/228* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 2006/0271351 A1 | 11/2006 | Mirkovic et al. | |
| 2015/0074528 A1* | 3/2015 | Sakalowsky | G06F 3/048 715/716 |
| 2015/0100143 A1* | 4/2015 | Gao | H04H 20/18 700/94 |
| 2016/0291924 A1* | 10/2016 | Bierbower | G06F 16/4387 |
| 2017/0242653 A1* | 8/2017 | Lang | G06F 3/165 |
| 2018/0233136 A1 | 8/2018 | Torok et al. | |
| 2018/0233137 A1* | 8/2018 | Torok | G06F 3/167 |
| 2018/0233147 A1 | 8/2018 | Tukka | |
| 2018/0286391 A1 | 10/2018 | Carey et al. | |
| 2018/0321897 A1* | 11/2018 | Bierbower | G06F 3/16 |

FOREIGN PATENT DOCUMENTS

GB 2558066 A 6/2017

* cited by examiner

*Primary Examiner* — Leonard Saint Cyr
(74) *Attorney, Agent, or Firm* — Leason Ellis LLP

(57) ABSTRACT

The invention provides a content playback system comprising a plurality of playback devices, each of which is configured to detect a voice command from a user and to play content. The system is configured to store an account conversation state associated with an account shared by the plurality of playback devices, and a device conversation state that is associated with a first playback device of the plurality of playback devices. When a voice command is detected by the first playback device, the system is configured to control the first playback device using information in the account conversation state and the device conversation state associated with the first playback device as an input. This may improve continuity of experience for a user across the plurality of playback devices.

19 Claims, 3 Drawing Sheets

CONTENT PLAYBACK SYSTEM

CROSS-REFERENCE TO RELATED APPLICATION

This application claims under 35 U.S.C. § 119(a) the benefit of Great Britain Patent Application No. 1816363.4 filed Oct. 8, 2018, the entire contents of which are incorporated herein by reference.

FIELD OF THE INVENTION

The present invention relates to systems for playing content via one or more voice-controlled playback devices. Each playback device is capable of playing content (e.g. audio content), and detecting a voice command from a user.

BACKGROUND

Voice-controlled speakers (sometimes referred to as "smart speakers") enable users to speak voice commands to interact with the speaker, as opposed to inputting commands manually (e.g. via buttons). A voice-controlled speaker typically includes a microphone for detecting and recording voice commands from the user, and a speaker for playing audio content. An on-board controller in the voice-controlled speaker may be configured to interpret detected voice commands (e.g. using speech recognition software), and to control the speaker accordingly, e.g. to play content requested by the user. The on-board controller may also control the speaker to communicate with the user, e.g. to ask the user a question or to provide information to the user. The content played by the speaker may for example be stored locally (e.g. in a memory of the speaker), or it may be stored remotely (e.g. on a remote content server) and transmitted to the speaker.

For some voice-controlled speakers, interpretation of the voice commands is performed remotely rather than by an on-board controller. For example, voice command interpretation may be performed through an online service. In such a case, the voice-controlled speaker may be connected to the internet, and configured to transmit the detected voice commands to a remote server where interpretation of the voice command is carried out. The remote server may then transmit instructions to the voice-controlled speaker in order to control the voice-controlled speaker in accordance with the user's voice command.

SUMMARY OF THE INVENTION

At its most general, the present invention provides a voice-controlled content playback system having a plurality of playback devices (e.g. speakers), which enables conversations between a user and the system to be continued as the user moves from one playback device to another. This is achieved by storing (e.g. in the cloud) both an account conversation state associated with an account shared by the plurality of playback devices, and a device conversation state associated with a specific one of the plurality of playback devices, that are accessed when the user interacts with any of the playback devices, in order to provide context to the user's requests and provide continuity of experience to the user.

According to a first aspect of the present invention, there is provided a content playback system comprising: a plurality of playback devices, wherein each playback device is configured to detect a voice command from a user, and wherein each playback device is configured to play content; wherein the system is configured to: store an account conversation state associated with an account shared by the plurality of playback devices, wherein the account conversation state includes information relating to a previous interaction between a user and one of the plurality of playback devices; store a device conversation state associated with a first playback device of the plurality of playback devices, wherein the device conversation state includes information relating to a previous interaction between a user and the first playback device; and in response to a voice command from a user being detected by the first playback device, control the first user device using the voice command, the account conversation state and the device conversation state associated with the first user device as inputs.

Thus, in the first aspect of the present invention, an account conversation state that includes information relating to a previous interaction between a user and one of the plurality of playback devices is taken into account when controlling a playback device that detects a voice command from a user. This enables conversations between a user and the system to be continued as the user moves from one playback device to another.

For example, a user may instruct a first playback device to play albums by a particular artist. The account conversation state may then be updated to store information indicating that the user is playing an album by that particular artist. The user may then instruct a second playback device, for example in another room, to play a different or next album by that particular artist. In the first aspect of the present invention, the information stored in the account conversation state provides context for this second request by indicating the album that was being played by the first playback device. In the absence of this context, it would not be possible to determine a "different" or "next" album by the same artist to be played by the second playback device.

The account conversation state may include facts about things the user and the system have discussed in the past.

For example, the account conversation state may include a song or playlist that the user is currently listening to, which was generated based on an interaction the user had with one of the playback devices.

Furthermore, the system is configured to take into account a device conversation state associated with the first user device when controlling the first user device.

The device conversation state is different from the account conversation state, in that the device conversation state is associated with a particular playback device. In contrast, the account conversation state is associated with a particular account (for example a particular user or a group of users sharing a single account) that is shared by the plurality of playback devices, and is not limited to a particular device.

The device conversation state associated with a playback device may include information relating to an ongoing or recent interaction between the user and that particular playback device.

An interaction between a playback device and a user may be categorised as, or determined to relate to, a device specific conversation if it involves the playback device anticipating a response from the user, for example if it involves the playback device asking the user a question that requires an answer to that question, for example "should I play more music by this artist".

The device conversation state may hold information indicating the immediate/current interaction where the playback device has asked a question of the user.

More specifically, the device conversation state may include information relating to an interaction between the playback device and the user for which the playback device is waiting for a response from the user.

As an example, the device conversation state may include an indication of the most recent exchange in a conversation between the user and the playback device. For instance, if the playback device asks the user to confirm their song choice, the device conversation state for that playback device may indicate that the user was asked to confirm their song choice, and that the playback device anticipates a response to that question.

In a case where there is no ongoing conversation with a particular playback device, or where the user has not interacted with that playback device before, the device conversation state for that playback device may include an indication that there is no ongoing conversation with that device (e.g. the device conversation state may be empty).

When a voice command is detected by a playback device, the system may look up the device conversation state associated with that device. In some cases, there may be no device conversation state associated with a particular playback device (e.g. because the playback device was recently added to the system). In this case, the system may be configured to generate a device conversation state associated with that playback device.

In contrast, an interaction between a playback device and a user may be categorised as, or determined to relate to, an account specific conversation if the playback device does not anticipate a response (or a further response) from the user.

By taking into account the device conversation state, it is possible to determine whether a voice command detected by one of the playback devices relates to an ongoing conversation between the user and that device.

For example, the system may determine whether a voice command received from a playback device relates to an ongoing conversation with that playback device, or whether it relates to an ongoing conversation that the user is having with a system as a whole.

This may avoid conflicts between different conversations that the user is having with the system as a whole and with specific playback devices. For example, if a playback device is waiting for an answer to a question that the playback device has asked the user, and the user provides an instruction relating to an ongoing conversation that the user is having with the system (for example "play the next album"), the playback device may confuse this instruction with an answer to the question and may not be able to process the answer. In contrast, the provision of the device conversation state and the account conversation state in the present invention allows the system to put the user's instruction in the proper context, and to determine if it is an answer to a device specific question or a continuation of an ongoing conversation that the user is having with the system.

The use of both an account conversation state and a device conversation state may also avoid conflicts in the case where multiple users are having conversations with different user devices in the system. For example, where a first user is having a conversation with a first user device and a second user is having a conversation with a second user device, and both users are sharing the same account, the system may interpret voice commands received by each user in the context of the relevant user device. This may avoid conflicts between the two conversations.

Thus, the combination of an account conversation state and device conversation state may enable a user to have a continuous experience between multiple playback devices, without conflicting with other conversations being carried out with the system.

The first aspect of the present invention may have any one, or, to the extent that they are compatible, any combination of the following optional features.

Herein the term "content" refers to any type of playable content, e.g. audio content (e.g. songs, audio recordings, etc.) and/or video content (e.g. video clips, films, etc.). Any suitable media file format for the content may be used.

The term "playback device" means any device capable of playing back such content.

The term "content playback system" may mean a content playback apparatus, or a plurality of devices connected together via a communications network, for example the plurality of playback devices connected together by a communications network, such as a local area network.

The account being "shared by the plurality of playback devices" may mean that each of the plurality of playback devices has access to, or is logged into the system as, that account.

An account may relate to a single user or a group of users. The group of users may be defined, or may be any user that uses the plurality of playback devices. In other words, the plurality of playback devices may be considered to belong to a single account.

Typically, a group of users will share a single account, and the system will not distinguish between different users when detecting voice commands and subsequently controlling the playback devices.

The plurality of playback devices may all be identical (e.g. they may all be the same model of playback device). Alternatively the plurality of playback devices may include different types of playback device (e.g. they may be different models of playback device).

Each playback device is configured to detect a voice command from a user. For example, each playback device may include a microphone for detecting voice commands from a user.

A voice command from a user may be any spoken instruction for the playback device, for example an instruction to play a particular type or piece of content, or an instruction to control the playback of content currently being played.

Each playback device may include a playback mechanism for playing content. For example, each playback device may include a speaker for playing audio content, and/or a screen for displaying visual content. Examples of suitable playback devices include speakers, screens, televisions, mobile phones and computers.

Each of the playback devices may be disposed at a different location, e.g. in different rooms of a building. In some examples, one or more of the playback devices may be located in a vehicle.

The account conversation state includes information relating to a previous interaction between the user and one of the plurality of playback devices. In some examples, the account conversation state may include information relating to previous interactions between the user and multiple playback devices.

Herein, the term "previous interaction" refers to an interaction that took place in the past, i.e. before the voice command is detected by the current playback device.

The previous interaction may be with a different one of the plurality of playback devices at which the voice command is detected, or with the same playback device.

An interaction may correspond to a request made by the user to one of the playback devices, or to a conversation between the user and one of the playback devices.

For example, the account conversation state may include an indication that the user previously requested a particular song/album to be played.

The account conversation state may also or alternatively include an indication of content that was previously played to the user via one or more of the playback devices.

The account conversation state may also or alternatively include a user preference previously specified by the user, for example that the user likes a particular piece or content or a particular creator of content (e.g. musician/band).

Where the user has not previously interacted with any of the playback devices, the account conversation state may include an indication that there are no previous interactions between the user and the playback devices.

Using the voice command, account conversation state and device conversation state as inputs in the control of the playback device may involve using the voice command, account conversation state and device conversation state as input parameters in a control algorithm for controlling the playback devices.

When using the voice command, account conversation state and device conversation state as inputs, the system may consider the device conversation state for the playback device before considering the account conversation state.

The device conversation state associated with the first playback device may include an indication of whether or not a voice command from a user is awaited at the first playback device.

For example, where the playback device has asked the user a question, the system may expect a voice command from the user to be detected at that playback device. In this manner, when that playback device detects a voice command, the system may recognise the voice command as the response awaited at the playback device, instead of a voice command relating to a more global conversation between the user and the playback devices of the system. This may provide additional context for the system to interpret the voice command, to facilitate interpretation of the voice command. This may avoid other conversations that are being carried out with other playback devices in the system from being affected by the current conversation, as each conversation may be interpreted in the context of a conversation with that device (i.e. with the device conversation state).

The system may be further configured to, in response to the voice command being detected by the first playback device, update the device conversation state associated with the first playback device based on the detected voice command.

In this manner, the device conversation state may be regularly updated as the conversation progresses, in order to provide an accurate context for interpreting detected voice commands. Where no voice command is detected in response to a question asked by the playback device, the device conversation state may be updated to indicate that a voice command from the user is awaited at that playback device.

The system may comprise a memory separate from the plurality of playback devices; and the system may be configured to store the device conversation state in the memory.

Thus, in the present invention the device conversation state(s) may be stored remotely from the playback device(s).

As the device conversation state is stored remotely from the playback devices, the playback devices may not be required to store or process any information relating to the device conversation state. This may facilitate implementation of the system, as it may simplify the firmware required on each of the playback devices. This may also facilitate integration of new user devices into the system, so that the system can easily be expanded.

The system may comprise a memory separate from the plurality of playback devices; and the system may be configured to store the account conversation state in the memory.

Thus, in the present invention the account conversation state may be stored remotely from the playback device(s).

As the account conversation state is stored remotely from the playback devices, the playback devices may not be required to store or process any information relating to the account conversation state. This may facilitate implementation of the system, as it may simplify the firmware required on each of the playback devices. This may also facilitate integration of new user devices in The account conversation state and the device conversation state may be stored in the same memory. This may further simplify the system.

The memory may comprise cloud storage. In other words, the memory may be remote memory that is accessed by the playback devices directly or indirectly (for example via a cloud server) via the internet. In this case, the playback devices may have communications devices for communicating directly or indirectly with the memory via the internet.

The system may be configured to store a plurality of device conversation states, each one associated with a different respective one of the plurality of playback devices. For example, the system may store a device conversation state for each playback device in the system that a user has interacted with, or where the playback device is waiting for a user response. The system may store a device conversation state for each of the plurality of playback devices.

The system may comprise a controller separate from the plurality of playback devices, and the controller may be configured to control each of the plurality of playback devices. For example, the controller may comprise a cloud server.

Controlling each of the plurality of playback devices using a single controller separate to the playback devices further simplifies the system, and means that the playback devices do not need to each include such a controller. Again, this may simplify the firmware required on each of the playback devices. For example, the playback devices may be "dumb" playback devices.

Furthermore, controlling all of the plurality of playback devices using a single separate controller makes it easier to control all of the playback devices based on the account conversation state and the device conversation state.

The controller may be connected to each of the playback devices, in order to control the playback devices and receive data (e.g. voice commands) from, and transmit data to, the playback devices. For example, the playback devices may be connected to the controller via a computer network. Thus, each of the playback devices may include a network interface for connecting the playback device to a network, e.g. via a wireless connection or via a wired connection. In some examples, the controller may be connected to the playback devices via the internet, e.g. the controller may be implemented by a computer or server connected to the internet. In this manner, the controller may be located "in the cloud". Each of the playback devices may be individually connected, via the internet, to the controller. Alternatively, the playback devices may all be connected to a central hub which is itself connected to the controller (e.g. via the internet). The hub may be configured to transmit information between the playback devices and the controller.

The controller may include the memory in which the account conversation state and device conversation state(s) are stored.

When one of the playback devices detects a voice command from a user (e.g. via its microphone), it may transmit the voice command to the controller. For example, the playback device may transmit a recording or an audio stream of the voice command to the controller. The playback device may also transmit an identifier associated with that playback device, so that the controller can identify which playback device transmitted the voice command. In one embodiment, each of the playback devices may be configured to transmit audio to the controller when it detects noise above a predetermined threshold. The controller may store the received voice command in a memory, so that the voice command can be accessed and analysed. In response to receiving a voice command transmitted by a playback device, the controller may analyse the voice command to determine the verbal content of the voice command (e.g. the words contained in the voice command). This may be achieved using conventional speech recognition software and techniques for extracting words and/or phrases from voice commands.

The controller may further use the account conversation state associated with the user and the device conversation state associated with the relevant playback device to interpret the voice command from the user, in order to determine the user's intent. Herein, the term "user's intent" (or "user intent") refers to the outcome desired by the user when the user makes a voice command to a playback device. For example, where the voice command is "play the next album" and the account conversation state includes an indication that the user was previously listening to the first album by band A, the controller may determine that the user wishes to hear the second album by band A. Thus, the account conversation state provides additional context for interpreting the voice command, based on previous interactions between the user and the playback devices.

Then, based on the determined intent of the user, the controller may control the playback device which detected the voice command. In this manner, the controller uses the voice command and the account conversation state as inputs for controlling the first playback device.

In some embodiments, controlling a playback device may include playing content via that playback device.

For example, where the system (e.g. controller) determines that the user's intent is to play the second album by band A, the system may control the playback device to play content corresponding to the second album by band A. In other examples, the system (e.g. the controller) may determine that further information is required from the user. In this case, the controller may control the playback device to ask the user for additional information (e.g. via a speaker in the playback device).

The controller may control a playback device by transmitting an instruction/command to that playback device. For example, the controller may transmit audio content to the playback device, together with an instruction to play the audio content. The controller may also transmit different types of instructions to the playback device, e.g. turn device on/off, turn volume of speaker up/down, display text on screen, etc.

By using the account conversation state as an input to control the playback device which detected the voice command, it is possible to take into account previous interactions between the user and the other playback devices (i.e. playback devices other than the one that detected the voice command). This may enable the user's intent to be extracted from the voice command more accurately. In particular, it may reduce the amount of information that the user is required to include in their voice command in order to obtain a desired outcome. This may facilitate use of the system.

Furthermore, this may enable the user to have a continuous experience when moving from one playback device to another (e.g. by moving between rooms where different playback devices are located). This is because the account conversation state is not limited to a particular playback device (and for example may be stored centrally so that it can be easily accessed). Hence, information relating to an interaction between the user and a first playback device may be used to interpret a voice command from the user to a second playback device at a later point in time.

As the account conversation state and device conversation state are typically not stored on the playback devices, the playback devices may remain "stateless". This may simplify the configuration of the playback devices, and facilitate integration of new playback devices into the system, as the playback devices are not required to perform analysis of voice commands and/or storage/analysis of conversation states, i.e. processing at the playback devices may be minimised.

The information relating to a previous interaction between the user and one of the plurality of playback devices may include an indication of content played via that one of the plurality of playback devices. For example, the information may include an indication that the user was listening to album X by artist Y.

The information relating to a previous interaction between the user and one of the plurality of playback devices may include an indication of a content playlist determined for the user based on the previous interaction between the user and that one of the plurality of playback devices. For example, the user may ask a first playback device to play the ten most popular songs by artist Y. The system may then create a playlist including the ten most popular songs by artist Y and start playing the playlist.

In some embodiments, the system (e.g. the controller) may be further configured to update the account conversation state based on the controlling of a playback device. Thus, the account conversation state may be updated to indicate the result of the user's voice command to a playback device. For example, if in response to the voice command from the user, the system controls the first playback device to play the first album by band A, the controller may update the account conversation state to indicate that the user is playing the first album by band A. In this manner, the account conversation state may be updated each time the user interacts with one of the playback devices. This may enable the user's latest interactions with the system to be taken into account when interpreting voice commands from the user, in order to improve the accuracy with which the controller determines the user's intent. This may also enable the controller to build a user profile based on the user's requests, which provides an indication of the user's tastes and/or preferences. For example, the account conversation state may include an indication of the number of times a particular song/album was requested, or an indication of the number of times a particular song was skipped. Such a user profile may further improve the accuracy with which the user's intent can be extracted from voice commands, and improve the continuity of experience between different playback devices.

Where multiple users are using different playback devices in the system, the account conversation state may include information relating to interactions between the multiple users and the different playback devices. For example, where a first user is playing song A via a first playback device and a second user is playing song B via a second playback device, the account conversation state may indicate that both songs A and B were recently played.

In some embodiments, the system (e.g. the controller) may be further configured to, in response to a voice command from a user being detected by one of the plurality of playback devices, identify the user and look up an account conversation state associated with the user. In this manner, the controller may automatically look up an account conversation state associated with a particular user, when a voice command from that user is detected at a playback device.

The system may include an account database having a plurality of registered accounts. For example, each playback device of a particular content playback system may be associated with the account in the account database. Thus, the account may be identified by determining which playback device transmitted the voice command to the controller.

The controller may be configured to identify an account from the account database based on the detected voice command. This may be achieved using conventional voice recognition (or "speaker recognition") techniques. Once the account has been identified, the controller may look up an account conversation state associated with that account, among the account conversation states stored in the controller. In a case where there is no account conversation state associated with the identified user, the controller may be configured to generate an account conversation state associated with that user.

In some embodiments, controlling a playback device may include generating or adapting a content playlist based on the detected voice command and the account conversation state, and playing the content playlist via that playback device. Thus, the system may be configured to generate or adapt (change) a content playlist based on the voice command and the account conversation state, and play the generated or adapted playlist via the playback device that detected the voice command.

Where the control is performed by a separate controller, playlist generation may be performed at the controller, i.e. remotely from the playback devices. This may enable the user to continue playing the same playlist as they move from one playback device to the next. In particular, the playlist and the user's position in the playlist may be recorded in the account conversation state.

Herein a "playlist" refers to a list of content items (e.g. audio or video files) that are to be played sequentially or, in some cases, in random order. The playlist generation or adaptation may further be based on the device conversation state associated with the first playback device.

In some embodiments, the content playback system may further comprise a content server configured to store content that is playable by the plurality of playback devices.

The controller may access content on the content server, and control the playback devices to play content from the content server.

Where the controller generates a playlist, the controller may generate the playlist from the content stored on the content server.

The content server may be part of the controller (e.g. the content is stored in a memory of the controller). Alternatively, the content server may be a separate component that is connected to the controller via a computer network (e.g. the Internet).

In some embodiments, the plurality of playback devices may comprise a plurality of speakers. Thus, the playback devices may be voice-controlled speakers. In this manner, the content playback system may play audio content (e.g. music).

The controller may control the speakers to play audio content, and/or to communicate with the user (e.g. to ask the user a question).

According to a second aspect of the invention, there is provided a method of controlling a plurality of playback devices, each playback device being configured to detect a voice command from a user and to play content, the method comprising: storing an account conversation state associated with an account shared by the plurality of playback devices, wherein the account conversation state includes information relating to a previous interaction between a user and one of the plurality of playback devices;
storing a device conversation state associated with a first playback device of the plurality of playback devices, wherein the account conversation state includes information relating to a previous interaction between a user and the first playback device; detecting a voice command from a user via the first playback device; and controlling the first playback device using the voice command, the account conversation state and the device conversation state associated with the first playback device as inputs.

The second aspect of the present invention may optionally have any one, or, to the extent they are compatible, any combination of the features of the first aspect discussed above.

The second aspect of the present invention may optionally have any one, or, to the extent they are compatible, any combination of the following optional features.

The device conversation state associated with the first playback device may include an indication of whether or not a voice command from a user is awaited at the first playback device.

The method may comprise, in response to the voice command being detected by the first playback device, updating the device conversation state associated with the first playback device based on the detected voice command.

The method may comprise storing the device conversation state in a memory separate from the plurality of playback devices.

The method may comprise storing the account conversation state in a memory separate from the plurality of playback devices.

The memory may comprise cloud storage.

The method may comprise storing a plurality of device conversation states, each one associated with a different respective one of the plurality of playback devices.

The method may comprise controlling each of the plurality of playback devices using a controller separate from the plurality of playback devices.

Controlling a playback device may include playing content via that playback device.

The method may further include updating the account conversation state based on the controlling of a playback device.

The method may further include: in response to detecting a voice command from a user via one of the plurality of playback devices, identifying the user based on the detected voice command; and looking up an account conversation state associated with that user.

Controlling a playback device may include generating or adapting a content playlist, and playing the content playlist via that playback device.

BRIEF DESCRIPTION OF THE DRAWINGS

Examples of the invention are discussed below with reference to the accompanying drawings, in which.

DETAILED DESCRIPTION

Figure 1:
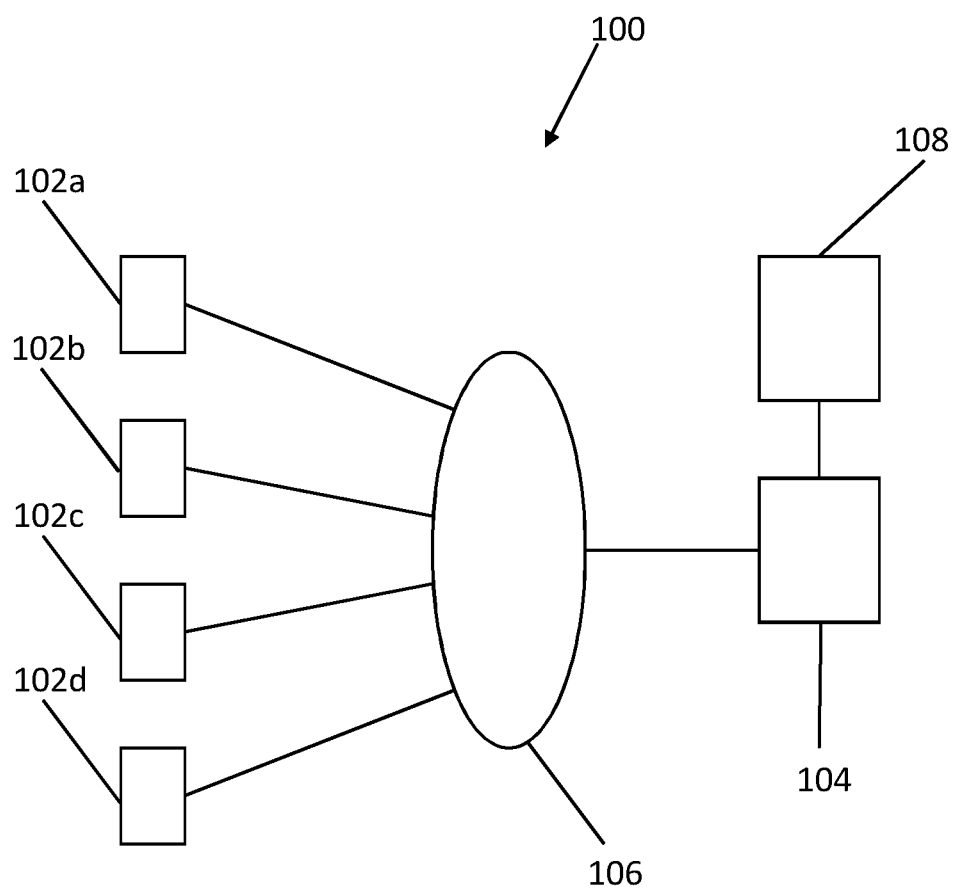
FIG. 1 is a schematic diagram of a content playback system that is an embodiment of the invention.

FIG. 1 is a schematic diagram showing a content playback system 100 that is an embodiment of the invention. Content playback system 100 includes a plurality of playback devices 102a-102d. In the embodiment, there are four playback devices, however in other examples there may be more or fewer playback devices (i.e. there may be any number of playback devices). In the embodiment, each playback device 102a-102d includes a speaker for playing audio content, and a microphone for detecting voice commands from a user. The content playback system 100 further includes a controller 104. Each playback device 102a-102d is communicatively coupled to the controller 104 via a computer network 106, so that data can be transmitted between each of the playback devices 102a-102d and the controller 104. Each of the playback devices 102a-102d may include a network interface for connecting the playback device to the computer network 106. The computer network 106 may include any suitable type of computer network, such as a local area network (LAN), a telecommunications network or the internet. For example, the playback devices 102a-102d may be connected to the controller 104 via the internet. The playback devices 102a-102d and the controller may communicate using any suitable communication protocol.

The playback devices 102a-102d may be conventional voice-controlled speakers which are connectable to a network. A playback device may also be implemented by a user's smartphone or any other suitable device having a microphone, a speaker and a network interface. The playback devices 102a-102d may be connectable to a network wirelessly (e.g. via Wi-Fi or Bluetooth), or via a wired connection (e.g. Ethernet). Each of the playback devices 102a-102d may be located at a different location. For example, each of the playback devices 102a-102d may be located in a different room/area of a building. One or more of the playback devices 102a-102d may be located in a vehicle. One or more of the playback devices may be portable, e.g. it may be carried around by a user.

Figure 2:
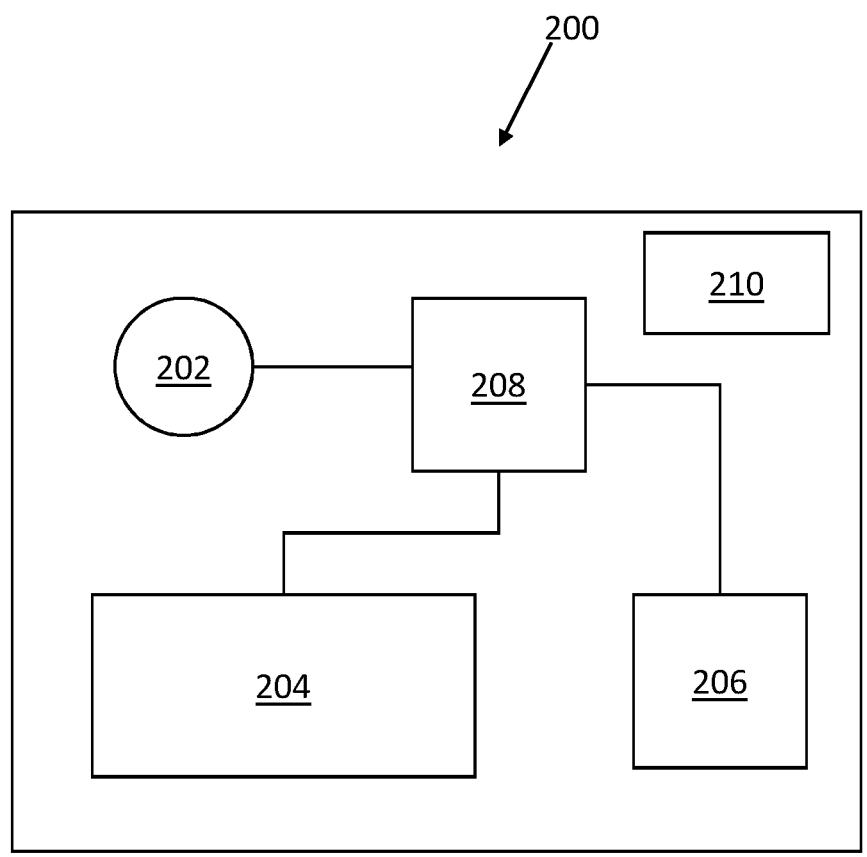
FIG. 2 is a schematic diagram of a playback device that may be used as part of a content playback system that is an embodiment of the invention.

FIG. 2 is a schematic diagram showing the components in a playback device 200 that may be used in a content playback system according to an embodiment of the invention (e.g. system 100). Playback device 200 includes a microphone 202 for detecting voice commands from a user, a speaker 204 for playing audio content, and a network interface 206 for connecting the playback device 200 to a computer network. The playback device 200 includes a device controller 208 which is connected to each of the microphone 202, the speaker 204 and the network interface 206. The playback device 200 also includes a power supply 210 for powering the playback device 200. The power supply 210 may include a battery (e.g. where the playback device is portable) and/or a power input connection for receiving power from an external power source. The device controller 208 is configured to control each of the microphone 202, the speaker 204 and the network interface 206. In particular, the device controller 208 is configured to control the network interface 206 to transmit data to, and receive data from, an external device (e.g. the controller 104) via the network interface 206. The device controller 208 is configured to control the speaker 204 to play audio content via the speaker 204 (e.g. content received from the controller 104 via the network interface 206). The speaker 204 may also be used to communicate with the user, e.g. to ask the user questions or provide information to the user. The device controller 208 is also configured to control the microphone 202 to detect and/or record audio from the environment. In particular, the device controller 208 is configured to detect voice commands via the microphone 202, and transmit the voice commands to an external device (e.g. controller 104) via the network interface 206. For example, when the microphone 202 picks up sound above a predetermined threshold, the device controller 208 may be configured to transmit a recording or live stream of the audio picked up by the microphone to the controller 104. The device controller 208 may be configured to cancel signals detected by the microphone which correspond to audio being played by the speaker 204. This may improve detection of voice commands. In this manner, voice commands from a user detected at the playback device 200 may be transmitted to the controller 104 of the content playback system. In some cases, a voice command may be started with a wake-word, or a button press on the playback device.

Returning to FIG. 1, the controller 104 may be implemented by a computer or server having software installed thereon for controlling the playback devices 102a-102d and carrying out the processes discussed below. In the embodiment shown, the controller 104 is also communicatively coupled to a conversation memory 108 for storing account conversation states and device conversation states. Where the controller 104 is connected to the playback devices 102a-102d via the internet, it may be referred to as a "cloud server". In this case, the playback content system may be provided as an online service which the user can sign up to. The controller 104 may include a memory in which content (e.g. a plurality of media items such as audio files) is stored, the content being playable by the playback devices 102a-102d. In another embodiment, the content may be stored on a separate content server, which is accessible by the controller 104. The controller 104 may transmit content to the playback devices 102a-102d over the network 106, so that the content can be played by the playback devices. The controller 104 may also transmit instructions to the playback devices 102a-102d in order to control the playback devices 102a-102d. When a playback device receives an instruction from the controller, the device controller (e.g. device controller 208) of that playback device may interpret the instruction and control the components of the playback device accordingly. For example, the controller 104 may instruct a playback device to play content, to switch itself on or off, or to increase/decrease speaker volume.

The content playback system 100 enables multiple users to share the system (typically by sharing a single account that the playback devices are logged in to) and have conversations with different playback devices in the system, or for a single user to have multiple conversations with different playback devices in the system. In particular, the content playback system may avoid conflicts from arising between the different conversations, whilst providing continuity of experience for a user moving from one playback device to the next. This is achieved by storing an account conversation state and device conversation states associated with the playback devices 102a-102d. The account conversation states and device conversation states may be stored in a memory accessible by the controller. The memory may be located in the controller, or it may be separate from the controller. In the example shown in FIG. 1, the user and device conversation states are stored in conversation memory 108.

Typically, the account conversation state is associated with an account that is shared by all of the playback devices, for example that all of the playback devices are logged in to. Typically therefore any user using any of the playback devices will use the same single account, such that the system does not identify users or differentiate between different users when detecting voice commands and subsequently controlling a playback device.

The account conversation state contains information relating to a previous interaction between a user and one or more of the playback devices 102a-102d. In particular, the information may relate to one or more actions carried out by the controller in response to a voice command received from a user. For example where, in response to a voice command from a user, the controller plays content via one of the playback devices 102a-102d, the account conversation state may indicate the content that was played. In another example, a user may indicate a preference (e.g. "I like band A") by issuing a voice command to one of the playback devices 102a-102d. In this case, the account conversation state may include an indication of that preference. Each time the controller carries out an action in response to a voice command from a user, the controller may update the account conversation state to include an indication of that action. In this manner, the account conversation state may include a list of actions recently carried out by the controller in response to voice commands from a user. Similarly, the account conversation state may also include a list of preferences recently indicated by a user.

In an alternative embodiment, there may be more than one account conversation state, each associated with a single user or a group of users. In this case, a user may be identified by the system, e.g. by voice recognition by one of the playback devices, to identify with of the account conversation states should be accessed and/or updated when a voice command by that user is detected.

The device conversation state is associated with a specific playback device. The device conversation state relates to conversations between a user and that specific playback device for which the playback device anticipates a response from a user. The device conversation state may include an indication of the most recent exchange in a conversation between a user and that specific playback device. For example, the device conversation state may include the last voice command received from a user at that playback device, and/or the last statement/question made by the playback device (under control of the controller 104). Additionally, or alternatively, the device conversation state may include an indication of whether a response is awaited from a user at that specific playback device and what the anticipated response relates to. For example, the controller 104 may control one of the playback devices 102a-102d to ask the user a question (e.g. via its speaker), such that the controller 104 expects to receive a voice command from the user in response via that playback device. In this manner, the device conversation state relates to the immediate/current interaction between a user and the playback device. In contrast, the account conversation state relates to actions carried out in response to voice commands from a user and/or user preferences. Unlike the device conversation state, the account conversation state is not limited to a specific playback device.

Figure 3:
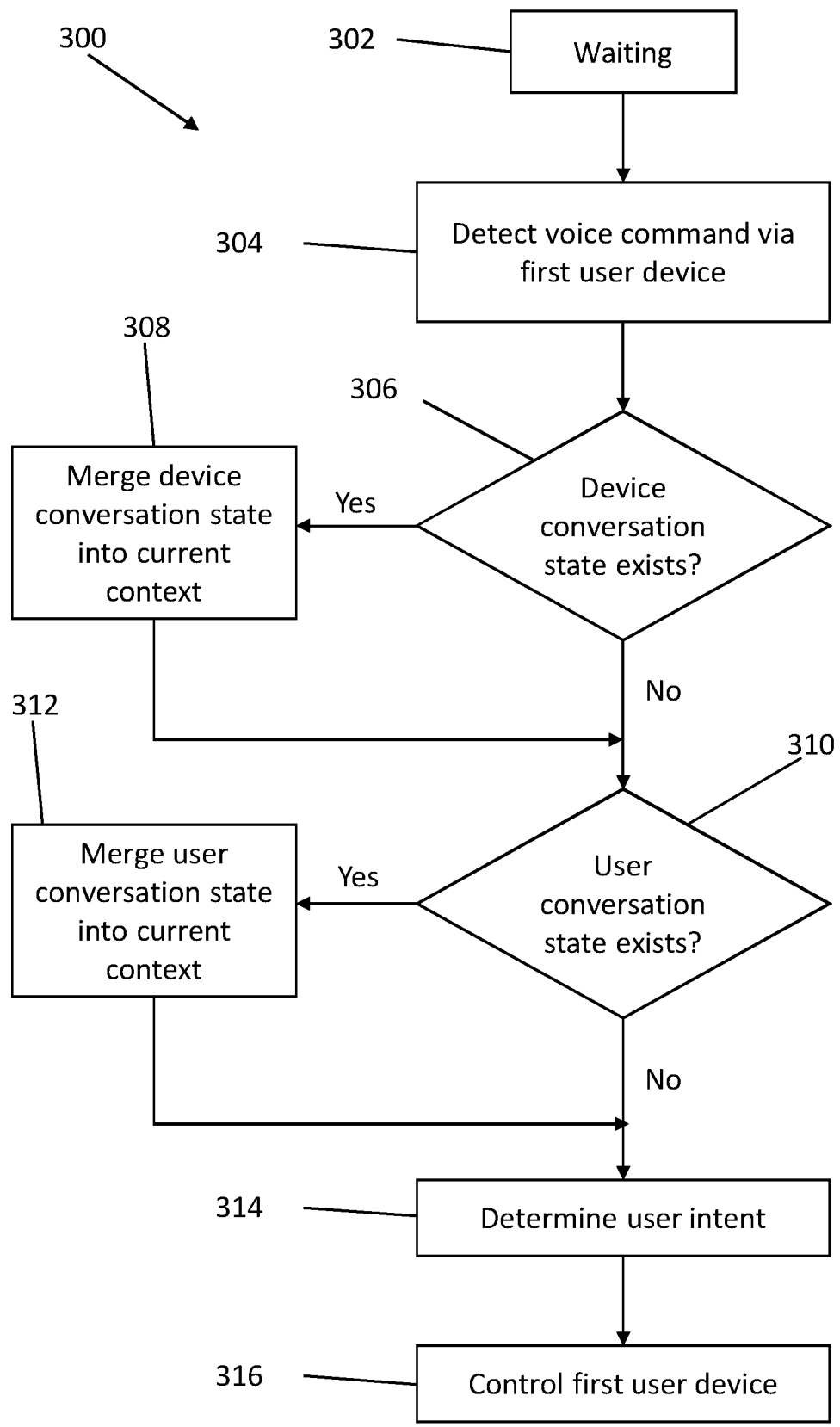
FIG. 3 is a flow-diagram showing a process carried out by a controller in a content playback system that is an embodiment of the invention.

FIG. 3 is a flow diagram 300 illustrating a process performed by a controller of a content playback system that is an embodiment of the invention. For example, FIG. 3 may represent a process carried out by controller 104. At step 302, the controller is in an idle state, waiting to receive a voice command from the user. At step 304, a voice command from a user is detected via a first playback device of the plurality of playback devices in the content playback system. The voice command is transmitted from the first playback device to the controller. The controller may store the voice command in a local memory so that the voice command can be analysed.

At step 306, the controller looks up a device conversation state associated with the first playback device. The first playback device may transmit an identifier together with the voice command, so that the controller can identify the first playback device. The controller may look up the relevant device conversation state by searching a memory (e.g. conversation memory 108) in which device conversation states are stored. If the controller finds a device conversation state associated with the first playback device, it accesses the device conversation state and moves on to step 308. At step 308, the controller merges the device conversation state into a "current context" which is used to interpret the detected voice command. The current context may include a variety of information that provides context to the controller for interpreting the user's voice command. For instance, the current context may include information from the user's profile, information relating to the user's location, the current time, etc. By merging the device conversation state into the current context, the controller is able to take into account the information relating to the current conversation between the user and the first playback device that is stored in the device conversation state, when interpreting the voice command. If, at step 306, there is no device conversation state associated with the first playback device, the controller moves on directly to step 310. In some cases, where there is no device conversation state associated with the first playback device, the controller may generate a new device conversation state associated with the first playback device.

At step 310, the controller looks up an account conversation state associated with an account that the system is logged into, or an account associated with the specific user making the voice command. This may be done by searching a memory (e.g. conversation memory 108) in which account conversation states are stored. In some cases, this may be done based on user information held by the controller or in a database of registered users. For example, where the content playback system is provided as an online service, the user may have an account with the service provider. Then, the controller may look up the account conversation state corresponding to the user's account. As another example, the user may be identified based on the voice command using voice recognition software. If the controller finds an account conversation state associated with the user, it accesses the account conversation state and moves on to step 312. At step 312, the controller merges the account conversation state into the current context. In this manner, the controller is able to take into account the information in the account conversation state when interpreting the voice command. If, at step 310, there is no account conversation state associated with the user, the controller moves on directly to step 314. In some cases, where there is no account conversation state associated with the user, the controller may generate a new account conversation state associated with the user.

In the example shown, the device conversation state is prioritised over the account conversation state, i.e. the device conversation state is merged into the current context before the account conversation state. This may facilitate interpretation of the voice command.

At step 314, the controller determines the user's intent. This is done by analysing the detected voice command based on the current context. Depending on the results of steps 306 and 310, the current context may include information from the device conversation state associated with the first playback device and the account conversation state. The first step is to extract the verbal content of the voice command, e.g. the words contained in the voice command. This may be achieved using conventional speech recognition software and techniques. For example, the voice command may be converted into a string of text. An algorithm is then used to determine the user's intent from the verbal content of the voice command, using the current context as an input in the algorithm.

The user intent may be determined based on a set of pre-defined rules. The set of pre-defined rules may correspond to a set of user intents supported by the system. In such a case, the user intent may be determined by applying the set of pre-defined rules to the inputs which are the voice command, device conversation state and user conversation state.

Alternatively, the user intent may be determined using a machine learning approach. This may involve some feature engineering applied to the voice command, device conversation state and user conversation state to convert them into useful numeric features, which may be followed by a common technique for multi-class classification. Such a machine learning approach may require a large amount of annotated example data that can be used to train a model. Once trained, the model can be applied to determine user intent.

At step 316, the determined user intent is used to control the first playback device. The controller controls the first playback device by transmitting an instruction and/or content to the first playback device. For example, where the controller determines that the user's intent is to play album X by band A, the controller may transmit the relevant content to the first playback device (e.g. via content streaming), together with an instruction to play the content. In some cases, the controller may generate a content playlist based on the determined user intent. The first playback device may then be controlled to play the content playlist.

The process illustrated in FIG. 3 enables the content playback system to provide a continuous experience as the user moves from one playback device to the next (e.g. when the user goes from one room to the next). This is due to the use of the account conversation state in interpreting the voice command. In particular, the account conversation state provides previous interactions between the user and one or more of the playback devices as context for interpreting the voice command. For example, when the user plays a particular playlist via a first one of the plurality of playback devices, this may be indicated in the account conversation state. The user may then move to another playback device (e.g. in another room), and make a voice command such as "Play the next song". The controller interprets this voice command in the context of the account conversation state, and so may determine that the user intent is to play the next song in the playlist.

Additionally, the process illustrated in FIG. 3 may avoid the occurrence of conflicts between different ongoing conversations. This is due to the use of the device conversation state in interpreting the voice command. By interpreting each voice command in the context of the conversation state of the playback device which detected the voice command, conflicts between conversations between users and different playback devices in the system may be avoided. This may enable multiple users to share a content playback system, without the conversation of one user interfering with the conversation of another user.

Table 1 below shows an example conversation where two users (user A and user B) have simultaneous conversations with different playback devices, and how a conflict between the conversations is avoided. The column labelled "Conversation" includes example conversations between a user and a playback device. The column labelled "Controller action" shows actions taken by the controller in response to the conversation in the corresponding cell of the "Conversation" column. The column labelled "Step" is used to number the steps in the conversation. In this example, user A is located in a first room and is interacting with a first playback device of the system (Device A); user B is located in a second room and is interacting with a second playback device of the system (Device B). Steps 1-2 in Table 1 correspond to the conversation between user A and Device A, and steps 3-4 correspond to the conversation between user B and Device B. The two conversations occur simultaneously.

As the system takes into account the device conversation state associated with the relevant playback device when interpreting voice commands, conflicts between the two conversations are avoided. In particular, at step 2, User A may reply "90s" without conflicting with user B's conversation; and at step 4 user B may reply "Yes", without conflicting with user A's conversation. This is because in each case the device conversation state indicates a type of response awaited from the user.

TABLE 1

Example conversation and controller actions

| Step | Conversation | Controller action |
| --- | --- | --- |
| 1 | User A: "Play some rock." Device A: "Sure, do you prefer rock from the 80s or 90s?" | Update device conversation state of device A to hold "genre: rock" and to indicated that device is waiting for user to specify "era". |
| 2 | User A: "90s" | Play 90s rock via device A. Update account conversation state to indicate 90s rock has been played. |
| 3 | User B: "What's the current number 1 song?" Device B: "It's song A. Shall I play it?" | Update device conversation state of device B to hold "song A" and to indicate that confirmation is |

TABLE 1-continued

Example conversation and controller actions

| Step | Conversation | Controller action |
|------|--------------|-------------------|
| | | awaited. |
| 4 | User B: "Yes." | Play song A via device B. Update account conversation state to indicate that song A has been played and that current charts have been referred to during the conversation. |

Table 2 below shows another example conversation that users may have with the content playback system. In the example of Table 2, there are two users using the content playback system: User A and User B. In steps 1-3, User A is located in a first room and is interacting with a first playback device (Device A). In step 4, User B is located in a second room and is interacting with a second playback device (Device B). In step 5, User A enters the room where Device B is located, so User A and User B are in the same room. In step 6, User A makes a voice command which is detected by Device B. As can be seen from Table 1, whenever the controller controls one of the playback devices to play content, the controller also updates the account conversation state to indicate the content that is being played. Additionally, when a user indicates a preference, the account conversation state is updated accordingly (see step 3). In step 6, the controller uses the account conversation state and the device conversation state for Device B to interpret User A's voice command. Based on the device conversation state for Device B (updated in step 4), the controller determines that the detected voice command does not correspond to a response to the question asked by Device B in step 4, e.g. because the verbal content of the voice command does not relate to the 80s hip hop playlist selection. In this manner, a conflict between the conversation with User A and the conversation with User B is avoided. Based on the account conversation state (updated in steps 1 and 3), the controller interprets that the intent of user A is to play album Y (even though the user did not explicitly state the album name). In this manner, the content playback system provides a continuous experience to User A, as they move from Device A to Device B.

TABLE 2

Example conversation and controller actions

| Step | Conversation | Controller action |
|------|--------------|-------------------|
| 1 | User A: "What albums by band A can I play?" Device A: "Band A's three albums are X, Y and Z". User A: "Play album X". | Control Device A to play album X. Update account conversation state to indicate that user is playing the first of band A's albums. |
| 2 | User A: "I love this track." Device A: "Okay, shall I play more by band A in the future?" | Update device conversation state of Device A to indicate that user needs to confirm band preference. |
| 3 | User A: "Yes" Device A: "OK" | Update account conversation state to |

TABLE 2-continued

Example conversation and controller actions

| Step | Conversation | Controller action |
|------|--------------|-------------------|
| | | indicate band preference. |
| 4 | User B: "Play some 80s hip hop." Device B: "I heard hip hop from the 1980s, is that right?" | Update device conversation state of Device B to indicate that user needs to confirm playlist selection. |
| 5 | [User A enters room where device B is located] | |
| 6 | User A: "Play the next album from band A." Device B: "OK, here is album Y." | Control Device B to play album Y. Update account conversation state to indicate that user is playing the second of band A's albums. |

We now describe a further example of a user interacting with a content playback system of the invention. In response to detecting the voice command "Play 'Experience'" at a first playback device, the system may perform the following steps:

1. Categorise the user's intent as "playback" via a set of pre-defined rules, e.g. because the voice command starts with "play";

2. Extract the name of the item to play: "Experience";

3. Find possible candidates to meet this request from a music catalogue or database. In this example, this returns an album name and a song name;

4. Push the candidates into the device conversation state associated with the first playback device. Ask the user, via the first playback device: "Do you want to play the album by The Prodigy or the song by Ludovico Einaudi?"

Following step 4 in this example, the device conversation state of the first playback device may be represented by:

```
{
    "entities": [
        {"type":"album", "id":"a123", "name": "Experience", "artistname": "The Prodigy"),
        {"type":"song", "id":"s456", "name": "Experience", "artistname":"Ludovico Einaudi"}
    ]
}
```

In other words, the device conversation state may contain information relating to both the album and the song that were found.

Subsequently, if the system detects the voice command "Play the album" at the first playback device, it may perform the following steps:

5. Categorise the user's intent as "playback" via a set of pre-defined rules, e.g. because the voice command starts with "play";

6. Extract the name of the item to play: 'the album'. This may be understood by the intent rules as referring to something from a conversation state;

7. Check the device conversation state of the first playback device for an album;

8. On finding the album in the device-level conversation state, play this album via the first playback device and clear the device conversation state of the first playback device;

9. Push the album into the account conversation state.

Following step 8 in this example, the device conversation state of the first playback device may be represented by:

```
{
  "entities": [ ]
}
```

In other words, the device conversation state of the first playback device may be empty.

Subsequently, if the system detects the voice command "Play that album again" at the first playback device, it may perform the following steps:

10. Categorise the user's intent as "playback" via a set of pre-defined rules, e.g. because the voice command starts with "play";

11. Extract the name of the item to play: 'that album'. This may be understood by the intent rules as referring to something from a conversation state.

12. Check the device conversation state of the first playback device for an album and find nothing this time, as the device conversation state is empty.

13. Check the account conversation state for an album.

14. On finding the album in the account conversation state, play the album via the first playback device.

CLAUSES

The invention is described in the following clauses:

1. A content playback system comprising:
    a plurality of playback devices, wherein each playback device is configured to detect a voice command from a user, and wherein each playback device is configured to play content;
    wherein the system is configured to:
        store an account conversation state associated with an account shared by the plurality of playback devices, wherein the account conversation state includes information relating to a previous interaction between a user and one of the plurality of playback devices;
        store a device conversation state associated with a first playback device of the plurality of playback devices, wherein the device conversation state includes information relating to a previous interaction between a user and the first playback device; and
        in response to a voice command from a user being detected by the first playback device, control the first playback device using the voice command, the account conversation state and the device conversation state associated with the first playback device as inputs.

2. The content playback system according to clause 1, wherein the device conversation state associated with the first playback device includes an indication of whether or not a voice command from a user is awaited at the first playback device.

3. The content playback system according to clause 1 or 2, wherein the system is further configured to, in response to the voice command being detected by the first playback device, update the device conversation state associated with the first playback device based on the detected voice command.

4. The content playback system according to any one of clauses 1 to 3, wherein:
    the system comprises a memory separate from the plurality of playback devices; and
    the system is configured to store the device conversation state in the memory.

5. The content playback system according to any preceding clause, wherein:
    the system comprises a memory separate from the plurality of playback devices; and
    the system is configured to store the account conversation state in the memory.

6. The content playback system according to clause 4 or 5, wherein the memory comprises cloud storage.

7. The content playback system according to any preceding clause, wherein the system is configured to store a plurality of device conversation states, each one associated with a different respective one of the plurality of playback devices.

8. The content playback system according to any preceding clause, wherein:
    the system comprises a controller separate from the plurality of playback devices, and
    the controller is configured to control each of the plurality of playback devices.

9. The content playback system according to clause 8, wherein the controller comprises a cloud server.

10. The content playback system according to any preceding clause, wherein controlling a playback device includes playing content via that playback device.

11. The content playback system according to any preceding clause, wherein the information relating to a previous interaction between the user and one of the plurality of playback devices includes an indication of content played via that one of the plurality of playback devices.

12. The content playback system according to any preceding clause, wherein the information relating to a previous interaction between the user and one of the plurality of playback devices includes an indication of a content playlist determined for the user based on the previous interaction between the user and that one of the plurality of playback devices.

13. The content playback system according to any preceding clause, wherein the system is further configured to update the account conversation state based on the controlling of a playback device.

14. The content playback system according to any preceding clause, wherein controlling a playback device includes generating or adapting a content playlist, and playing the content playlist via that playback device.

15. The content playback system according to any preceding clause, further comprising a content server configured to store content that is playable by the plurality of playback devices.

16. The content playback system according to any preceding clause, wherein the plurality of playback devices comprises a plurality of speakers for playing audio content.

17. A method of controlling a plurality of playback devices, each playback device being configured to detect a voice command from a user and to play content, the method comprising:
    storing an account conversation state associated with an account shared by the plurality of playback devices, wherein the account conversation state includes information relating to a previous interaction between a user and one of the plurality of playback devices;
    storing a device conversation state associated with a first playback device of the plurality of playback devices, wherein the device conversation state includes information relating to a previous interaction between a user and the first playback device;
    detecting a voice command from a user via the first playback device; and controlling the first playback device using the voice command, the account conversation state and the device conversation state associated with the first playback device as inputs.

18. The method according to clause 17, wherein the device conversation state associated with the first playback device includes an indication of whether or not a voice command from a user is awaited at that one of the plurality of playback devices.

19. The method according to clause 17 or 18, wherein the method comprises, in response to the voice command being detected by the first playback device, updating the device conversation state associated with the first playback device based on the detected voice command.

20. The method according to any one of clauses 17 to 19, wherein the method comprises storing the device conversation state in a memory separate from the plurality of playback devices.

21. The method according to any one of clauses 17 to 20, wherein the method comprises storing the account conversation state in a memory separate from the plurality of playback devices.

22. The method according to clause 20 or 21, wherein the memory comprises cloud storage.

23. The method according to any one of clauses 17 to 22, wherein the method comprises storing a plurality of device conversation states, each one associated with a different respective one of the plurality of playback devices.

24. The method according to any one of clauses 17 to 23, wherein the method comprises controlling each of the plurality of playback devices using a controller separate from the plurality of playback devices.

25. The method according to any one of clauses 17 to 24, wherein controlling a playback device includes playing content via that playback device.

26. The method according to any one of clauses 17 to 25, further including updating the account conversation state based on the controlling of a playback device.

27. The method according to any one of clauses 17 to 25, wherein controlling a playback device includes generating or adapting a content playlist, and playing the content playlist via that playback device.

The invention claimed is:

1. A content playback system comprising:
a plurality of playback devices, wherein each playback device is configured to detect a voice command from a user, and wherein each playback device is configured to play content;
wherein the system is configured to:
store an account conversation state associated with an account shared by the plurality of playback devices, wherein the account conversation state includes information relating to a previous interaction between a user and any one of the plurality of playback devices;
store a plurality of device conversation states, each one associated with a different respective one of the plurality of playback devices, wherein each device conversation state includes information relating to a previous interaction between a user and the playback device associated with that device conversation state, and wherein at least one of the plurality of device conversation states includes information relating to whether or not an interaction is ongoing between a user and the playback device associated with the at least one of the plurality of device conversation states; and
in response to a voice command from a user being detected by a first playback device of the plurality of playback devices, access the account conversation state and a device conversation state associated with the first playback device, and control the first playback device using the voice command, the account conversation state and the device conversation state associated with the first playback device as inputs.

2. The content playback system according to claim 1, wherein the device conversation state associated with the first playback device includes an indication of whether or not a voice command from a user is awaited at the first playback device.

3. The content playback system according to claim 1, wherein the system is further configured to, in response to the voice command being detected by the first playback device, update the device conversation state associated with the first playback device based on the detected voice command.

4. The content playback system according to claim 1, wherein:
the system comprises a memory separate from the plurality of playback devices; and
the system is configured to store the device conversation state in the memory.

5. The content playback system according to claim 4, wherein the memory comprises cloud storage.

6. The content playback system according to claim 1, wherein:
the system comprises a memory separate from the plurality of playback devices; and
the system is configured to store the account conversation state in the memory.

7. The content playback system according to claim 1, wherein:
the system comprises a controller separate from the plurality of playback devices, and
the controller is configured to control each of the plurality of playback devices.

8. The content playback system according to claim 7, wherein the controller comprises a cloud server.

9. The content playback system according to claim 1, wherein controlling a playback device includes playing content via that playback device.

10. The content playback system according to claim 1, wherein the information relating to a previous interaction between the user and one of the plurality of playback devices includes an indication of content played via that one of the plurality of playback devices.

11. The content playback system according to claim 1, wherein the information relating to a previous interaction between the user and one of the plurality of playback devices includes an indication of a content playlist determined for the user based on the previous interaction between the user and that one of the plurality of playback devices.

12. The content playback system according to claim 1, wherein the system is further configured to update the account conversation state based on the controlling of a playback device.

13. The content playback system according to claim 1, wherein controlling a playback device includes generating or adapting a content playlist, and playing the content playlist via that playback device.

14. The content playback system according to claim 1, further comprising a content server configured to store content that is playable by the plurality of playback devices.

15. The content playback system according to claim 1, wherein the plurality of playback devices comprises a plurality of speakers for playing audio content.

16. A method of controlling a plurality of playback devices, each playback device being configured to detect a voice command from a user and to play content, the method comprising:
- storing an account conversation state associated with an account shared by the plurality of playback devices, wherein the account conversation state includes information relating to a previous interaction between a user and any one of the plurality of playback devices;
- storing a plurality of device conversation states, each one associated with a different respective one of the plurality of playback devices, wherein each device conversation state includes information relating to a previous interaction between a user and the playback device associated with that device conversation state, and wherein at least one of the plurality of device conversation states includes information relating to whether or not an interaction is ongoing between a user and the playback device associated with the at least one of the plurality of device conversation states;
- detecting a voice command from a user via a first playback device of the plurality of playback devices;
- accessing the account conversation state and a device conversation state associated with the first playback device; and
- controlling the first playback device using the voice command, the account conversation state and the device conversation state associated with the first playback device as inputs.

17. The method according to claim 16, wherein the device conversation state associated with the first playback device includes an indication of whether or not a voice command from a user is awaited at that one of the plurality of playback devices.

18. The method according to claim 16, wherein the method comprises, in response to the voice command being detected by the first playback device, updating the device conversation state associated with the first playback device based on the detected voice command.

19. The method according to claim 16, wherein the method comprises storing the device conversation state in a memory separate from the plurality of playback devices.

* * * * *